Oct. 30, 1945.　　　　C. O. EMRICH　　　　2,388,046
PACKLESS VALVE
Filed Sept. 18, 1943
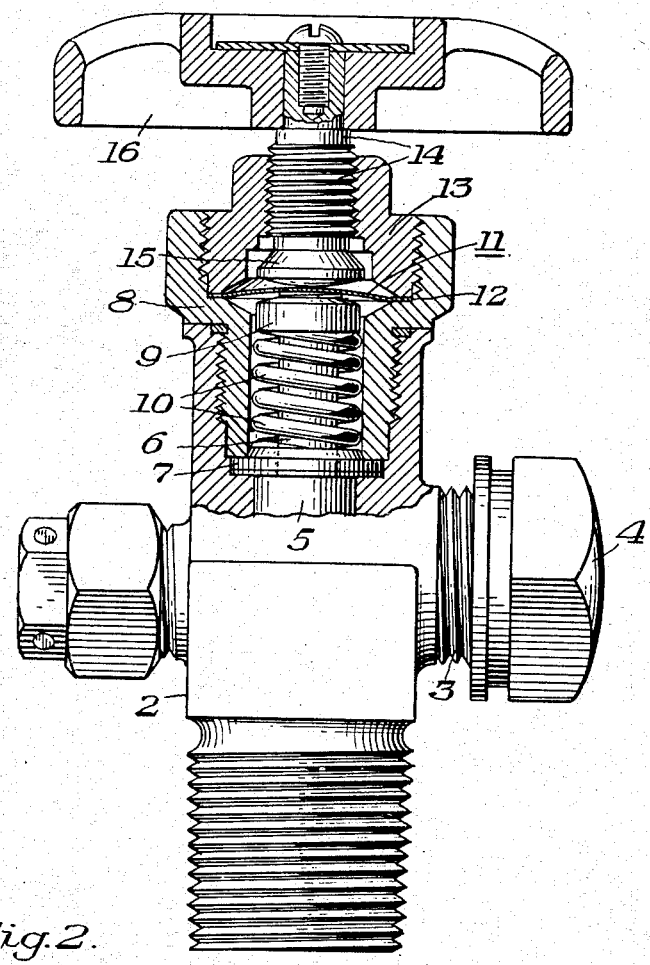
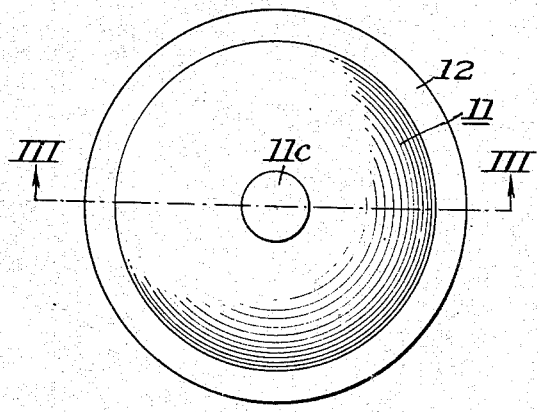
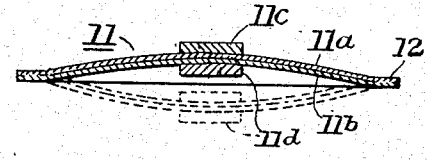
INVENTOR
Clarence O. Emrich
by his attorneys
Christy, Parmelee & Strickland Patented Oct. 30, 1945

2,388,046

UNITED STATES PATENT OFFICE 2,388,046

PACKLESS VALVE

Clarence O. Emrich, Pittsburgh, Pa.

Application September 18, 1943, Serial No. 502,917

4 Claims. (Cl. 251—31)

This invention pertains to valves, and especially to valves of the type generally referred to in the art as "packless valves," and is for an improvement in valves of this type wherein the life of the diaphragm used to transmit motion to the valve stem and prevent the escape of fluid is materially increased.

Packless valves of a type widely used have a valve body with a valve seat, and an axially movable valve, cooperating with the seat, is carried on a stem inside the valve body. This stem is urged to open position by a spring surrounding the stem and engaging an abutment on the upper end of the stem. In the valve body, above the stem, is a flexible metal diaphragm or disk which is usually clamped in place in the body by the valve bonnet removably carried at the top of the valve body. This bonnet has a stem threaded therethrough, with a hand wheel at its outer end and an abutment on its inner end that bears against the diaphragm. When the handwheel is screwed down, the diaphragm is forced down, and the valve stem is in turn forced down to close the valve. When the handwheel is screwed in the other direction, the spring, together with the pressure, if any, of fluid acting on the valve, lifts the valve stem, flexing the diaphragm in the opposite direction to open the valve.

These valves are designed for use primarily with high pressure fluids, particularly gases, such as oxygen, so called "bottled gas," refrigerants, and other high pressure gases. The diaphragm, providing the principal seal between the valve and the atmosphere, is exposed to high pressures. Because it must flex to accommodate the movement of the valve stem, it is thin, it must be resilient, and it must, when flat, have a diameter greater than the opening into which it is fitted, so that when it is in place, it will be bowed to one side or the other of a flat plane.

Usually the disks employed are formed and tempered so that they are incapable of coming to a position of repose in a flat form or plane. They always bow to one side or the other of a plane, and if flexed to a mid-plane instantly snap over center to a reverse position.

These disks are a primary source of trouble in such packless valves. From the use of a single disk, valve makers now resort to the use of at least four separate disks stacked one against another and of different metals. Notwithstanding this, the disks fail, allowing expensive or important gas to leak. For example, such valves are commonly used in oxygen systems for high altitude airplanes. A ruptured diaphragm may allow the gas to escape unnoticed and the crew of the bomber or other plane may be seriously endangered by failure of oxygen during combat or over hostile territory.

As above stated, the diaphragm is clamped around its peripheral edge between a seat formed in the valve body and a surface on the valve bonnet. The metal of which it is made, is tempered or annealed so that it will normally assume a bowed position. The over center flexing of the disk apparently fatigues or crystalizes the metal of the diaphragm just inside the edge which is clamped, so that the diaphragm will rupture just inside the clamped edge, or the diaphragm may completely separate from the clamped edge. Under other conditions the diaphragms may flex too far in closing the valve, so that they can not be forced up by the valve stem when the handwheel is backed off. This may happen especially if the gas pressure in the system is low, as on a tank which has been substantially exhausted, making it impossible to use the contents or recharge the tank.

According to the present invention this difficulty is overcome by using as a diaphragm, a bimetal sheet or disk. This diaphragm is made of two layers of metal, united over their contacting surfaces and having widely different coefficients of thermal expansion. Because of difference in thermal expansion, and not because of resilience or deformation of the metal this disk in repose has a normally bowed shape. Only a sufficient change of temperature will induce it to flex over center of its own accord. It may be mechanically forced over center in the operation of the valve, but this does not adversely affect the metal. A valve with such a bimetal disk has been operated more than three thousand times under pressure with no apparent effect on the diaphragm, whereas the disks normally used fail frequently under a hundred, and in most cases, substantially fewer operations.

My invention may be more fully understood by reference to the accompanying drawing, in which:

Figure 1 is a side view partly in side elevation and partly in vertical elevation, showing one form of valve to which my invention is applied, the parts being in the position which they assume when the valve is opened;

Figure 2 is a plan view of the diaphragm disk, the disk being slightly modified from the form shown in Figure 1;

Figure 3 is a transverse section through the center of the disk on line III—III shown in Figure 2.

In the drawing, 2 designates a valve body having its lower end threaded. The valve body has an outlet nipple 3 which is shown in the drawing as being covered with a cap 4, this cap being removed when the valve is in service. There is a valve element 5 which is carried on a valve stem 6 that is axially positioned in the body. The valve stem 6 passes through a fixed disk 7 that is received in the valve body. The valve body has a removable upper portion 8 telescopically screwed into it, the lower end of the part 8 seating on the disk 7 to hold it in place. On the upper end of the valve stem is an abutment 9. A spring 10 surrounding the valve stem and confined between the abutment 9 and the disk 7 tends to resiliently yield the valve to an open position.

In the upper part of the body portion 8 is a recess into which is set a diaphragm 11, the construction of which is hereinafter more fully described. A bonnet member 13 is screwed into the body member 8 and serves to clamp the peripheral edge 12 of the disk 11 and form a gas-tight seal. In the bonnet is a valve operating member comprising a stem 14 having an inner terminal portion 15 which bears against the top surface of the diaphragm. On the outer end of the valve operating stem is a hand wheel 16.

The construction of the valve is such that by screwing down on the valve operating member motion is transmitted through the diaphragm to the valve stem. The diaphragm is flexed in this closing movement of the valve so that instead of being bowed upwardly as shown in Figure 1, it is bowed in the reverse direction when the valve is completely closed. The diaphragm is normally subjected on its inner surface to the pressure of gas in the system in which the valve is used and the outer surface is subjected to atmospheric pressure. It comprises a packless seal through which motion is transmitted from the valve operating means to the valve stem.

The general organization as herein described is known to the art. My invention resides specifically in the construction of the diaphragm 11. As shown in Figure 3 this diaphragm, instead of being a single thickness of metal is comprised of two layers or laminae of metals having widely different coefficients of thermal expansion. These two layers of metal are united over their entire area and the disk as formed naturally bows outwardly or upwardly as shown in Figure 3. Any decrease in temperature serves to increase the upward bowing of the diaphragm, while any increase in temperature tends to straighten it and ultimately bow it in the opposite direction. From this fact it will be apparent that the difference in thermal coefficients of expansion tends to hold the disk in the outwardly bowed form, and not the inherent resilience of the metal as is the case where the diaphragm is merely a spring diaphragm. When the disk is flexed in the opposite direction by the closing of the valve, it does not, because of any inherent resilience, tend to bow itself in the reverse direction, whereas an ordinary spring disk such as that heretofore used when forced across the mid plane, tends instantly to bow in the reverse direction. The bimetal disk depends for its ability to always return to the upwardly flexed position when the valve is opened, on the difference in the coefficients of thermal expansion of the two metals. Because of this difference in the character of the resilience possessed by the diaphragm, the bimetal diaphragm will stand many thousands of flexings without rupture, whereas an ordinary spring diaphragm or resilient metal diaphragm either becomes permanently distorted or more commonly splits at the point where the rim is clamped in the valve body. Of course if the diaphragm ruptures in use, essential or valuable fluids may be lost. Not infrequently the rupture of the diaphragm jams the valve in the closed position so that it cannot be opened, particularly if the gas pressure in the system to which the valve is applied, is low. For example, valves used on oxygen tanks frequently jam when the tank is empty, so that new gas cannot be put into the cylinder until the valve is serviced.

In Figure 1 I have shown the diaphragm as having a tendency to normally bow upwardly. This would be preferred in most cases. For example in the oxygen system of airplanes the valve may, in a period of three or four minutes, be transported from a ground temperature of 90° F. to a high altitude temperature of perhaps minus 60° F. If the diaphragm bows upwardly, this change in temperature does not adversely reflect itself in the action of the diaphragm, whereas if the diaphragm were reversed, such change of temperature might tend to close the oxygen valve. In other situations, as for example where the valve is apt to be subjected from room temperature to an elevated temperature, the diaphragm could be reversed.

In other installations it may be desirable to use the flexing of the diaphragm under changes of temperature for the operation of the valve, in which case the bimetal disk would be turned in a direction to accomplish the desired result. For example, in a refrigerating system it might be desirable to have the hand operation of the valve plus an arrangement whereby, if there were a fire, the heat acting on the diaphragm would close the valve independently of the hand operation, in which case the diaphragm would function as a prime valve operating means.

In some instances, it may be desirable to fuse a small button of metal on the under side and top of the disk 11 at the center thereof so that the wear of the valve operating means and of the valve stem against the diaphragm will be taken by these buttons instead of on the diaphragm itself as shown in Figure 1. This is illustrated in Figures 2 and 3 wherein 11 designates the diaphragm having a rim portion 12. The diaphragm is formed of two layers of metal 11a and 11b. For example, one layer of metal may be steel and the other may be bronze, these metals having substantially different coefficients of thermal expansion. The metals mentioned are merely typical and various combinations are well known to those skilled in the art. Fused or welded to the top of the center of the disk is a button of metal, this button being designated 11c and on the under surface of the disk is a similar button 11d.

If the valve is exposed to fluids or gases which are apt to attack the metal of the diaphragm, the diaphragm may have a thin coating of a protecting metal. For example, the diaphragm shown in Figure 3 might have its surface, or at least the under surface, coated with a very thin film of tin. This film of tin, preferably applied to both surfaces, will also enable the diaphragm to be more effectively sealed between the valve body and the valve bonnet. If desired soft metal to facilitate sealing may be coated over the rim portion 12.

While I have described my invention in connection with one conventional form of valve, it will be understood that it is not limited to a valve of the construction shown. The bimetal diaphragm may be substituted for the metal bellows used in some types of packless valves. In such case it is merely necessary to use a diaphragm of appropriate diameter, and the bimetal diaphragm embodying the present invention when made of sufficiently large diameter, will provide the necessary range of movement.

I claim as my invention:

1. In a valve of the type having a valve body with a reciprocable valve element in the body, the valve element having a stem, the valve also having a valve operating element, and a flexible metal diaphragm interposed between the valve stem and the valve operating element forming a packless seal through which motion is transmitted from the valve operating member to the valve stem, wherein the diaphragm is a flexible sheet having a rim portion which is clamped in the valve body and a central area which is convexed in one direction and buttons fused to opposite surfaces of the center thereof to provide wearing surfaces, the sheet being formed of two layers of different metal intimately united over their entire surface, and having different coefficients of thermal expansion whereby temperature, instead of inherent resilience, determines the contour of the convexed portion of the diaphragm.

2. In a valve having a valve body with a movable valve stem and valve element therein and with a valve operating means and wherein there is a flexible diaphragm clamped around its peripheral edge in the valve body and being disposed between the valve stem and the valve operating means forming a packless seal, the invention which comprises using a resilient bimetal disk as the diaphragm, which disk is normally bowed in one direction and tends at a given temperature to always spring back to the position to which it is bowed, the two metals of the disk having dissimilar thermal coefficients of expansion and being coextensive with the entire area of the disk.

3. In a packless valve of the type having a valve stem and a valve operating stem in axial alinement with a flexible diaphragm between them said diaphragm being clamped around its peripheral edge, the invention which comprises forming the diaphragm of two metals coextensive with the area of the diaphragm and of dissimilar coefficients of thermal expansion united over their contacting areas, whereby at a given temperature the diaphragm tends to bow always in one direction.

4. In a packless valve having a valve stem and a diaphragm clamped at its peripheral edge sealed in the valve body for transmitting motion to the valve stem and for preventing the escape of fluid from the body, the invention which comprises forming the diaphragm of thin flexible sheet metal formed of a laminated bimetal material in which the laminae are coextensive and of different coefficients of thermal expansion and which diaphragm has a rim portion and a central convexed area, the rim portion being firmly clamped in the valve body.

CLARENCE O. EMRICH.